This invention relates to threaded joints and more particularly has to do with threaded connections between pipe sections such as are used for well pipe. It is particularly adapted for use in well tubing.

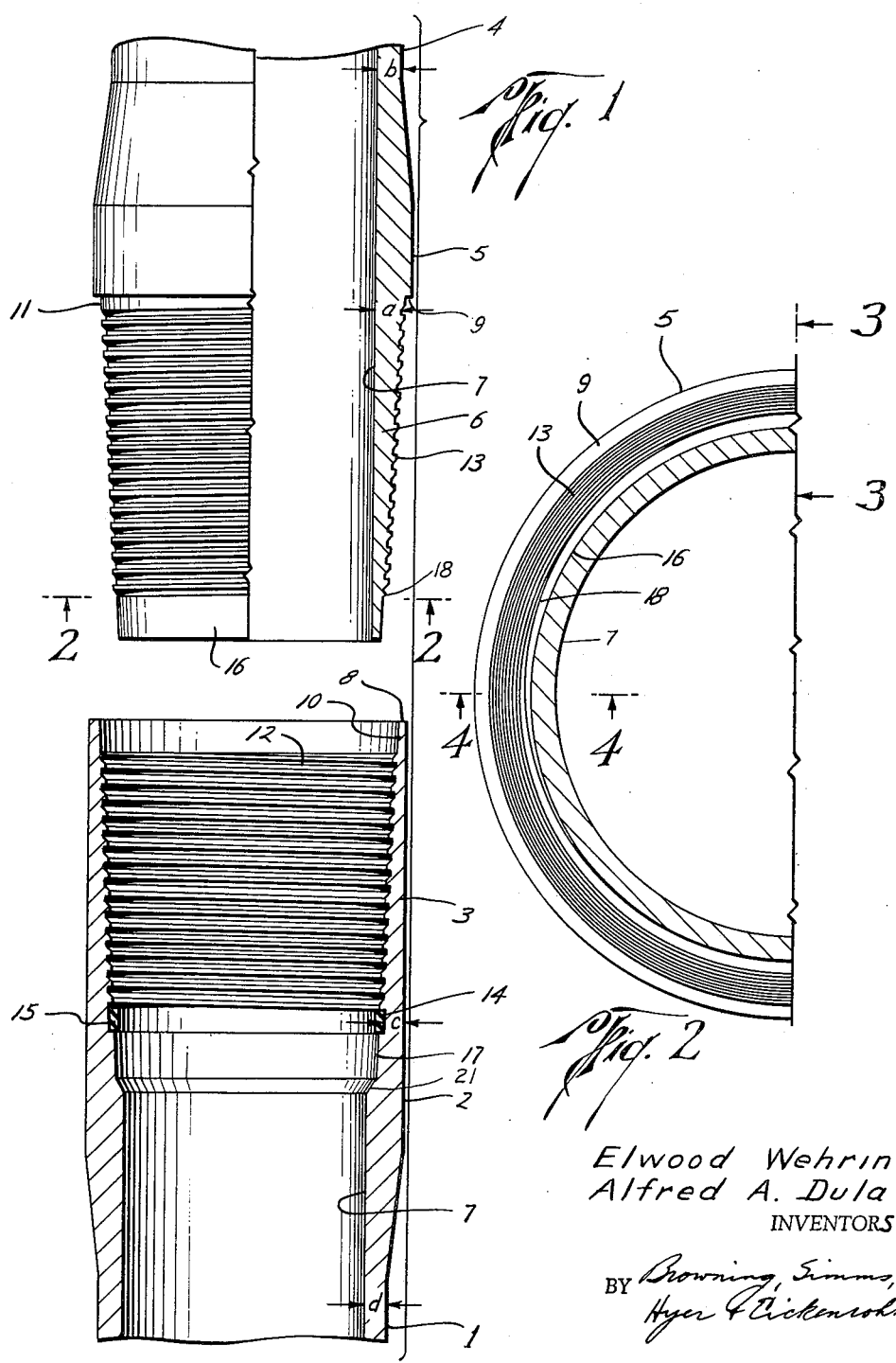

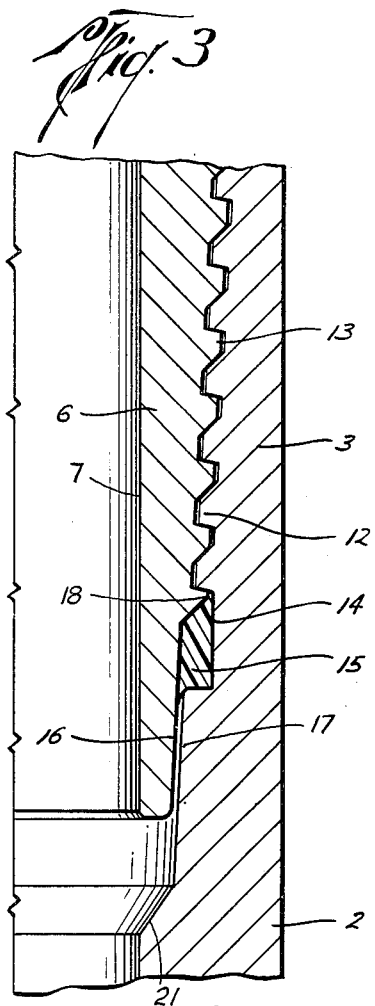
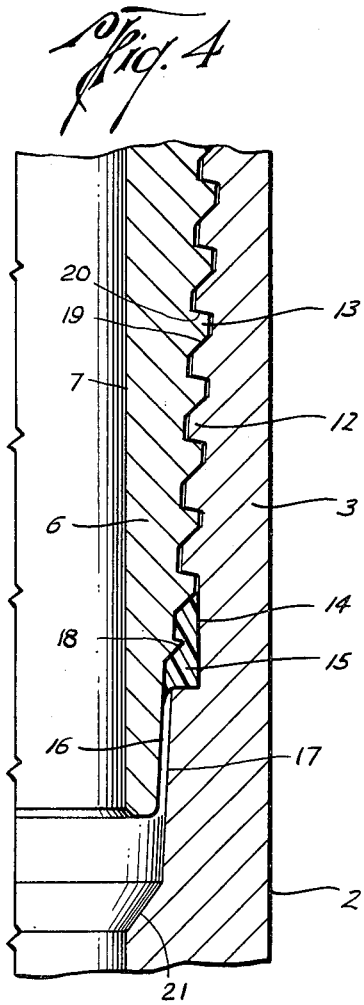
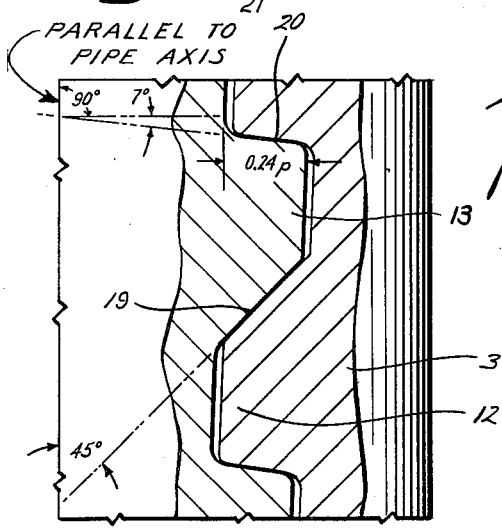
Elwood Wehring
Alfred A. Dula
INVENTORS 3,047,316
PACKED PIN AND BOX DRILL PIPE COUPLING WITH MEANS PREVENTING EXTRUSION OF PACKING RING
Elwood Wehring and Alfred A. Dula, Houston, Tex., assignors to Atlas Bradford Company, a corporation of Texas
Filed Oct. 1, 1958, Ser. No. 764,533
3 Claims. (Cl. 285—334)

It is a general object of this invention to provide a joint having the greatest joint efficiency with a minimum of upsetting or thickening of the pipe walls at the joints, yet which will be rugged, easily machined and adapted to be made up with a minimum number of turns.

A primary requirement for all equipment used in deep wells is that it be very rugged and capable of much rough handling without damage. This is especially true of threaded joints, because such joints are ordinarily put together as a pipe is being run into a well by having the lower end of the pipe started in the well and then joints added thereto, the portion in the well in each instance being suspended from a rotary table or the like with its box positioned uppermost while the next section to be added is lifted and lowered into the lower section so that the pin thereon engages the box. This operation is known as "stabbing." Thereafter the upper section is rotated relative to the lower to tighten up the joint. It will readily be seen that a slight mishandling of the heavy upper section could cause damage to the threads or produce cross threading unless the threads are especially designed to withstand exceptionally hard treatment. The search for a thread rugged enough to stand such treatment without damage has been substantially continuous and substantially industry-wide since the beginning of drilling of deep wells, and while a certain degree of ruggedness has been obtained, improvement in this direction is still greatly sought after.

One obvious way to improve the ruggedness of threaded connections is to increase the size of the threads so as to provide very coarse threads. However, an increase in the size of normal design threads requires an increase in the depth of cut in cutting the threads. If the threaded joint is to be strong enough to approach the strength of the pipe sections which it joins, a thing obviously highly desirable in any situation, it is necessary that as the size of threads is increased the thickness of the wall of metal into which the threads are cut must also be increased with respect to the thickness of the pipe walls.

The maintenance of a high strength joint structure as compared with the strength of the pipe sections joined thereby is especially necessary in the case of pipes employed in deep wells because the pipe is not only required to hold together and resist tremendous pressures from within, but it is also required to suspend its own weight and sometimes additional weight so that the forces tending to pull the uppermost joints of a string of pipe apart are at least the weight of the entire string of pipe, amounting to many thousands of pounds.

The thickening of the metal at the point where the threads are cut has been accomplished in the past by upsetting the end portions of the metal of the pipe sections so as to make these end portions thicker than the main portion of the pipe. Obviously this upsetting is preferably on the exterior of the pipe in order to avoid choking down the flow through the pipe, but the requirements for thickening of the metal have been so great at times in the past that both internal and external upsets have been employed. It is also highly desirable that the external upsetting of the pipe, which produces a larger effective outer diameter, be held to a minimum where the pipe is to be used in a well, because in deep well drilling it is highly desirable that the overall diameter of the hole drilled be kept as small as possible consistent with the insertion of pipes large enough to produce the desired flow. This requirement is tremendously accentuated when wells are completed in a manner which has recently become fairly common so as to produce flow from two or more different formations at different levels in the well, with the flow from each formation coming through a separate string of pipe in the well. In the past, such completions have most commonly been made by inserting strings of progressively smaller size into the well, one within the other, but more recently the practice has arisen of inserting two or more strings of pipe side by side into the well. This latter practice, especially, has accentuated the need for flow tubing of an outer diameter as free as possible from external enlargements, thus increasing the problem of providing high strength joints for pipes without excessive bulging or upsetting of the metal at the joints. This situation has not only prohibited further increases in the over-all size of threads employed in order to secure additional durability, but has given rise to the requirement that the threads be made as shallow as possible, preferably much shallower than has been conventional in the past.

Of course, joint efficiency, or the ratio of the strength of the joint to the strength of the pipe joined thereby, may be increased by decreasing the depth of thread so as to cut away less of the metal in forming the threads. However, if this is done by merely decreasing the size of the thread used and reducing the pitch, as would be usual, the result would be to increase the turns required for make up and the danger of cross threading and other damage in stabbing the pipe as well as the difficulty and expense of forming the thread.

The number of turns required for make up of the pipe from the time one joint member is stabbed into another until the joint is fully made up with leak-proof tightness is also an important factor, it being highly desirable to reduce as much as possible the number of turns required for make up. This may be done by increasing the taper of the threads, the taper being the amount by which the thread diameter increases per foot of length of thread. However, where the pressure or back face of a thread makes an angle of 10 degrees or more with a plane perpendicular to the axis of the joint, this being the minimum ordinarily employed in the past, there is a tendency for threads to jump out under extreme tension unless the taper does not exceed one inch per foot of length. Hence, there is a practical limit on the amount of taper with a back face angle of 10 degrees minimum.

It is desirable that the front face of the threads be at a much lesser angle to the axis than the rear face so it will act as a guide and align the pin in the box during the stabbing operation. The smaller this angle, the gentler is the guiding function. However, just as a reduction in the size of threads tends to make them less rugged and more subject to damage in stabbing, just so the decreasing of the angle of the front face of the threads narrows the thread crests until they become more subject to damage both in handling and in the stabbing operation.

In many usages, a closely fitted threaded engagement with appropriate thread lubricant will provide adequate sealing of the joint against leakage under pressure. However, where pressures are extremely high it has been found desirable to provide metal-to-metal contact over co-acting metal sealing surfaces. Ordinarily, such a seal is provided adjacent one end of the threaded engagement, usually the external end. However, in many instances it is desirable also to provide a seal at the internal end so that substances flowing through the pipe which may be corrosive or otherwise damaging to the threads will not be allowed to enter the threads. This is particularly true where the inner surfaces of the pipe are coated with plastic or the like for protection and the threads cannot be so protected. For this reason, even though it may be found that with certain types of metal-to-metal sealing engagement the pressure differential between the interior and exterior of a pipe may be held without leakage, it may be desirable to provide an additional seal which may or may not be of such a nature as to withstand by itself the differential pressures between interior and exterior of the pipe. Such seals have been heretofore provided but have consisted generally of rings, the ring being in a groove on one member and engaged by a taper surface on the other member so that when the two members are threaded together the tapered surface engaging the ring will force it radially more tightly into its groove and provide the sealing required. However, in order that such taper might be sufficient and yet not so steep as to tend to force the seal ring out of its groove, it has been required that extra turns be added to the amount of make up required for the joint and, as above explained, the minimum number of turns required for make up is highly desirable.

It is, therefore, an object of this invention to provide a threaded joint which will have the greatest possible joint efficiency with the minimum outer diameter of the pipe at the joints and yet which will be rugged, easily machined, and adapted to be made up with a minimum number of turns, as well as being provided with adequate sealing to withstand without leakage the pressure differentials to which it may be subjected.

Another object is to provide such a joint in which an adequate deformable seal will be provided without necessity for excessive turns in the make up of the joint.

Other objects and advantages of this invention will become apparent from the following description taken in connection with the accompanying drawings, which set out by way of illustration and example, one embodiment of the invention.

In the drawings:

FIG. 1 is a view partly in longitudinal cross-section and partly in elevation illustrating the pin and box of a joint constructed in accordance with this invention with the pin in position just before being stabbed into the box.

FIG. 2 is a partial transverse section through the pin of FIG. 1 taken along the line 2—2 of FIG. 1 and shown on an enlarged scale to illustrate the terminal portion of the thread on the pin at its smaller end.

FIG. 3 is a fragmentary longitudinal cross-section through one wall of the made up joint, the portion of the section which shows the pin being taken along the line 3—3 of FIG. 2.

FIG. 4 is a view similar to FIG. 3 but taken along the line 4—4 of FIG. 2.

FIG. 5 is a greatly enlarged fragmentary cross-section through the threads of a made-up joint constructed in accordance with this invention, with lines added to indicate the angles of various portions of the threads and relative dimensions thereof.

As will be seen from the foregoing, the problem with which this invention deals is many fold because when it is sought to do the most obvious thing to overcome one portion of the problem one is confronted with an increasingly serious situation regarding another portion of the problem.

However, it has been discovered that by reducing the pressure or back face angle of the threads to between 7 degrees and 7½ degrees with respect to a plane perpendicular to the axis of the joint, the thread taper may be increased to the range from 1 1/16 inches to 1 3/16 inches per foot measured along the diameter before such increase in taper is limited by the tendency for the threads to jump out of engagement under tension. The optimum value of such back face angle of the threads is 7 degrees. With this angle the threads may be cut by taps and dies but the shallowness of this angle is limited by the angle at which the taps and dies may work. Hence, angles of less than 7 degrees are not feasible where the threads are to be cut by taps and dies. However, an angle of 7 degrees permits the use of a taper of 1⅛ inches as an optimum value without substantial danger of the threads tending to jump out during tension on the joint.

In order to increase joint efficiency by making a shallower thread without at the same time increasing the number of turns required for making up and the danger of cross threading and difficulty and expense of forming the threads as well as the danger of damaging them in stabbing, it has been found that by modifying the shape of the conventional buttress type threads so as to use a 7 degree rear face angle and eliminating the portion forming the crest of the thread so as to make the thread shallower than conventionally employed, the depth of the thread may be reduced from 0.6 times the pitch, which is conventional, to 0.24 times the pitch. Such a reduction has been found not to result in objectionable tendency to jump under tension even with a thread taper of 1⅛ inches per foot. Such a thread is even more rugged and less subject to damage in stabbing and cross threading and requires less turns for make up than buttress type threads of standard depth and design.

It has further been found that when the threads are made shallower than conventional in accordance with this invention a front face angle as small as 45 degrees becomes feasible and may be employed without making the thread crests substantially narrower than conventional. Such a front face angle provides a very satisfactory guiding function in stabbing. The thread width is found even more satisfactory and a tighter threaded joint is provided if the threads are made of such width that the threaded engagement is entirely along the front and rear faces of the threads and not along their crests.

With regard to the metal-to-metal sealing surfaces, the joint of this invention is provided with mutually engagable shoulders on the pin and box capable of transmitting compression stresses and also torsional and bending stresses to secure joints strong in tension, compression bending, and torsion and which are leak-proof under all ordinary conditions. In accordance with this invention, furthermore, a tapered sealing surface is provided adjacent the outer portion of the joint between the threads and the engaging shoulders and it has been found that the taper of such surfaces is satisfactory if when the male seal is well lubricated and forced hard axially into the female seal, it will stick and remain there until it is forced out of engagement. Together with positive abutting shoulders this insures that within machining tolerances and under operating conditions an effective seal will be provided.

It has further been found that by forming the sealing ring groove adjacent the inner end of the joint and positioned to be entered by the forward end of the thread on the pin and using a gradually disappearing thread with a front face on an angle such as the 45 degree angle above described, the sealing ring may be compressed both radially outwardly and axially by the thread entering the groove, and adequate compression of the ring and closure of the end of the helical passage between the threads on the pin may be obtained with only a fraction of the make up conventionally required. While the expansion of the seal ring is more efficiently performed by a thread with an inclined front surface, it may be provided by a thread without such incline. The groove, in accordance with this invention, may have its wall on the opposite side of the groove from the threads of sufficient radial extent to provide substantially complete support for the entire radial extent of the seal ring against axial movement. The ring should have its radial thickness slightly greater than the depth of the groove, as shown in FIGURE 1 and its length axially of the joint should be not less than the thread pitch. The relatively short smooth nose part on the pin may be of a size to fit at its end snuggly within the ring and fairly close to but slightly spaced from such side of the groove and thereby prevent substantial extrusion of the ring in tightening with normal torques and pressures because the ring is compressed by an endwise movement of a compressing part into the groove rather than by increasing the size of the opening through the ring by forcing an oversize part into the inside of the ring to expand it radially. However, the ring is initially confined and expanded radially into snug engagement with the bottom and sides of the grooves by the tapered smooth nose part. Then the disappearing lead portion of the thread threads into the ring to locally expand it radially and cut into and force a part of the ring into the space between the first two full height threads to seal such space. Then the full height thread compresses the ring axially and radially to provide the final seal.

Referring now more in detail to the drawings, there is illustrated a joint constructed in accordance with this invention and comprising, as illustrated in FIG. 1, a pipe section 1 having an upset end portion 2 with a box portion 3 of a joint formed therein, and a second pipe section 4 having an upset end portion 5 thereon and a pin portion 6 formed on such upset end portion 5. In the instance illustrated the inside diameter of the pipe as shown at 7 is maintained within the upset end portion 2 and also within the upset end portion 5 and the pin 6 so that there will be no greater obstruction to flow through this joint than through the pipe sections joined thereby.

The box 3 is formed at its end with a radial sealing and bearing face 8 adapted when the joint is fully made up to bear against the endwise facing shoulder 9 formed adjacent the base of the threads of the pin member. This engagement provides not only a sealing engagement between these parts but also a positive stop to limit the amount of make up, provides for the transmission of torque through the joint when necessary, and provides stability in the joint against bending stresses.

Inwardly from the end 8 the box 3 is provided with a tapered surface 10 adapted to be opposed to and slightly spaced from the tapered surface 11 on the pin 6 between the large end of the threads on the pin and the shoulder 9.

The female threads 12 in the box and the male threads 13 on the pin are modified buttress threads the details of which will be presently discussed. It is sufficient at this point to note that they are relatively much shallower than conventional buttress type threads with respect to their pitch. Thus, they do not take up nearly as much radial space as conventional threads of the same pitch, yet because they are shallower the threads are wider and more rugged compared to their depth than are conventional threads. Because of their shallowness, the amount of upset required on the end portions of the pipe sections is reduced to a minimum but this is without sacrifice to ruggedness, ease of manufacture, etc. Furthermore, it is possible because of such shallowness to maintain a high joint efficiency which is represented by the thickness of the remaining wall at the last thread on the pin as represented by the letter "$a$" compared with the thickness of the pipe wall at a point where it is not upset as represented by the letter "$b$" on the pin end of the joint. On the box end this efficiency is represented by the smallest dimension in thickness of the metal of the joint which in this instance is the bottom of the seal ring groove and is represented by the letter "$c$," divided by the thickness of the pipe beyond the upset as represented by the letter "$d$."

At the inner ends of the thread 12 of the box member there is provided in accordance with this invention a seal ring receiving groove 14. This should be at least as deep as the depth of the threads but not substantially deeper, because if deeper it would reduce the efficiency of the joint. This groove 14 is so positioned that the threads 12 run out into the groove, thereby making it possible for male threads engaging the female threads 12 to be threaded in until they extend into the groove 14. The male threads 13 on the pin are so sized that when fully made up the smaller end of this thread will extend into the groove 14 by an amount sufficient to compress into the groove the seal ring 15 which initially is of a radial thickness slightly greater than the depth of the groove, and cause it to sealingly engage not only the bottom of its groove but also the nose portion 16 on the pin. This nose portion is externally smooth and tapered so that on initial movement into the ring it will compress the ring radially into the groove, and is adapted to fit within the box and fairly snugly within but slightly spaced from that portion of the box at 17 on the opposite side of the groove 14 from the threads 12 so that this smooth portion 16 substantially closes the groove 14 in a radial direction and effectively confines the ring against extrusion under normal sealing pressures. The portion 16 need be only long enough so that it will extend across the groove 14 by the time the end of the thread 13 begins to enter the groove so that the ring 15 will be confined in the groove 14 by the part 16 before it begins to be compressed by the entry of the thread 13 into the groove. It should be short enough so that at full make-up it will not engage the shoulder 21 at the end of the counterbore into which it extends and does not serve as a stop to limit make-up of the joint. By this arrangement it will be seen that as soon as the thread begins to enter the groove it will begin to compress the seal ring on one side and since the thread gradually tapers from a full thread until it vanishes into the surface of the nose portion 16 within approximately 90° to 180° at its end as shown at 18, this initial compression of the seal ring by the thread will extend over substantially half of the diameter circumference of the pipe. Furthermore, the vanishing portion will thread itself into the ring and the locus of this compression will rotate with respect to the seal ring and box as the tightening continues. As the vanishing portion threads and cuts into the ring it will force a portion of the ring into the entrance between the first two full height threads and seal such passage. For this purpose, the ring should have an axial extent not less than the thread pitch. It will expand until substantially the entire circumference of the seal ring is being compressed by the end of approximately one-half turn of the thread into the box. Thus, by the advancement of the thread into the groove to somewhat over one-half turn, the seal ring may be compressed sufficiently to provide the necessary seal. This is compared with two or more turns required to compress the seal ring by the previously practiced method of forcing a tapered nose on the pin into the interior of the seal ring or forcing a tapered zone in the box onto a seal ring on the pin.

The position of the parts with the leading end of the thread on the pin compressing the seal ring as just described, is shown in FIGS. 3 and 4. FIG. 3 is taken in a position to show the seal ring with a full inclined face of thread compressing it. FIG. 4 is taken in a position to show the vanishing portion of the end of the thread advanced into the seal ring to compress and cut into it somewhat and fill the space between the vanishing portion and the next full thread, with the next full thread likewise bearing on the seal ring to compress it. It is to be noted that the front or leading face of the thread where it advances into the groove 14 to engage the seal ring 15 is on the same angle as the front face of the remaining threads on the pin, namely approximately 45 degrees with respect to the axis of the joint as illustrated in FIG. 5.

In FIG. 5 the front faces of the threads on the pin and in the box are shown as being in engagement with each other along the line 19. This line of contact 19 is shown as being on an angle of 45 degrees with respect to the axis of the joint. Likewise, as hereinbefore noted, the rear faces of the threads are shown as being in contact along the line 20 in FIG. 5, the line 20 being at an angle of 7 degrees with respect to a plane perpendicular to the axis. Furthermore, the depth of thread is illustrated as being 0.24 times the pitch. With these proportions it has been found that the thread may be readily cut with tap and die in the box and on the pin respectively, yet the angle of the face 20 with respect to the line perpendicular to the axis is such that even with this shallow thread there is no troublesome tendency on the part of the threads to slip apart and jump under tensile load. This is true even when, as illustrated, the taper of the threads is as much as 1⅛ inches to 1 foot, which is somewhat larger than the conventional taper for this general type of thread.

The parts are so proportioned that the threads come into hand tight engagement just before the end surface 8 comes in contact with the shoulder 9.

The seal ring 15 may, of course, be made of any suitable sealing material but one sealing material which has been found highly satisfactory is tetrafluoroethylene.

Joints made in accordance with the foregoing description have been subjected to substantial tests as shown in the following three examples. In each of the following three examples, the test was made on a tubing connection in which the thread taper was 1⅛ inches per foot, the front face of the thread was at an angle of 45 degrees to the axis of the joint, the rear face of the thread was at an angle of 7 degrees to a plane perpendicular to the axis, the depth of the teeth was 0.24 times the pitch and the crests were so sized as to stand off slightly and not engage whereas the entire direct engagement of the threads with one another was on the faces thereof.

Each joint was formed on pipe which had an outer diameter of 2.375 inches and wall thickness of 0.190 inch. The tubing employed was an API external upset seamless tubing known as N-80.

In conducting the hydrostatic pressure tests, the three threaded connections were made up with from 700 to 1,000 foot pounds of torque. Internal pressure was then applied in the amount of 10,200 pounds per square inch and held for thirty seconds. Then the pressure was released. This cycle was repeated ten times. The joints were then broken out and made up ten times each with the above test procedure followed after each make up. The joints were then broken out and the seal rings removed. After making the connections back up with the seal rings removed, the pressure was again applied to 10,200 pounds per square inch and held for thirty seconds. It was released and repressured ten times. The connections were then broken out and made up ten times with the above test procedure followed after each make up.

The thread lubricant used on all of the above tests consisted of 60 percent powdered zinc and 40 percent lime soap grease.

At no time during the above tests was there any leakage at the connections either with the seal ring installed or without it installed.

In further tests, three sample joints of the character above described were tested, one being formed so that at hand tight make up the end of the box stood off 3/32 of an inch from the shoulder on the pin. Torque was then applied to bring the required shoulder contact and this occurred at 700 foot pounds. The joint was then broken out and it was found that 1,000 foot pounds was required for the breakout.

In the second sample, the construction was such that at hand tight make up there was a 5/64 inch stand off of the end of the box from the shoulder on the pin. In this instance, the torque required for shoulder contact was 1,000 foot pounds and the torque required for breaking out the joint was 1,400 foot pounds.

In the case of the third sample, the construction was such that at hand tight make up there was a 3/16 inch stand off between the end of the box and the shoulder on the pin. The torque required to produce shoulder contact was 1,350 foot pounds and that required to break out the joint after making it up was 1,800 foot pounds.

None of the three samples showed any sign of thread galling or joint distortion as the result of being made up and broken out in the manner described.

The result of these tests showed clearly that the breakout in each case was substantially higher than the make up torque required, but that make up and breakout could be carried out without galling of threads or distortion of the joint and that by make up within the limits indicated a tight joint could be obtained.

In view of the foregoing, it will be seen that by this invention a joint has been produced which is a highly efficient joint yet one in which the threads are rugged and capable of withstanding the rough usage encountered in wells but with adequate tensile strength to suspend the great weights required by well usage. Adequate sealing was provided on the tests of this joint, both by the joint with the seal ring employed and by the joint without the seal ring.

From the foregoing it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A pipe joint comprising a tapered threaded box having at the inner end of the threads a groove of a depth at least as great as the height of said threads and a width at least as great as the distance between corresponding portions of adjacent threads with the threads running out into the groove, a seal ring of a synthetic resin having substantially the properties of tetrafluorethylene substantially filling said groove and of a thickness slightly greater than the depth of said groove, and a tapered threaded pin with threads thereon complementary to the threads in said box and of an extent to enter the groove on full make-up of the pin into the box, said pin having an externally smooth end part projecting beyond the smaller end of the threads on the pin by a distance at least as great as the width of said groove but insufficient to abut any portion of said box at full make-up and fitting closely within said box at the edge of the groove opposite from the threads in the box with a clearance small enough to prevent extrusion of said ring under normal sealing pressures, and said threads on the pin disappearing gradually from full crest height into the surface of the externally smooth end part within approximately 90° to 180°, whereby said end part will first confine said ring, said disappearing thread will then thread into and cut and force a part of said ring into and seal the space between the first two threads, and the full thread on the pin will then compress said ring axially.

2. A pipe joint as in claim 1, in which said smooth end part is tapered to enter and place a distributed radial pressure over the inner surface of said ring to force it snugly into said groove in advance of the pressure placed thereon by the respective parts of said thread.

3. A pipe joint as in claim 1, in which the front faces of the threads are inclined to the pipe axis more than the rear faces whereby the pressures directly exerted thereby on said ring will have both radial and axial components, the latter toward the end of the pin.

References Cited in the file of this patent

UNITED STATES PATENTS

| | | |
|---|---|---|
| 659,336 | Booth | Oct. 9, 1900 |
| 1,226,921 | Stewart | May 22, 1917 |
| 1,590,357 | Feisthamel | June 29, 1926 |
| 2,051,499 | Siegle | Aug. 18, 1936 |
| 2,087,185 | Dillon | July 13, 1937 |
| 2,150,221 | Hinderliter | Mar. 14, 1939 |
| 2,196,966 | Hammer | Apr. 9, 1940 |
| 2,825,585 | Griffin | Mar. 4, 1958 |

FOREIGN PATENTS

| | | |
|---|---|---|
| 777,901 | Great Britain | June 26, 1957 |